Sept. 6, 1932.  E. BABB  1,876,444
METHOD OF MAKING CONDUITS OR THE LIKE
Original Filed May 2, 1928
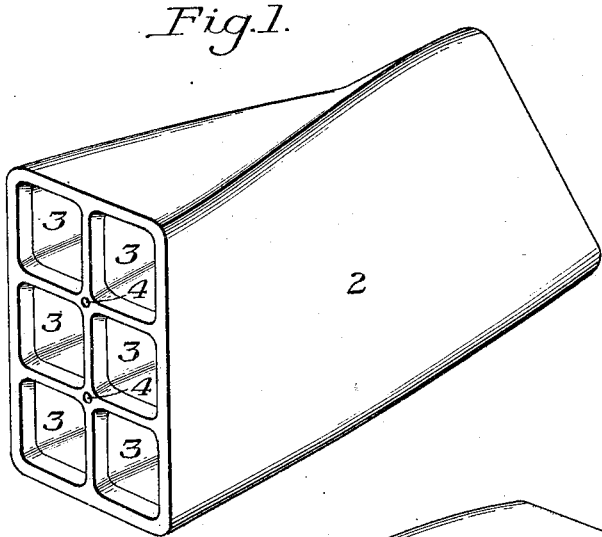
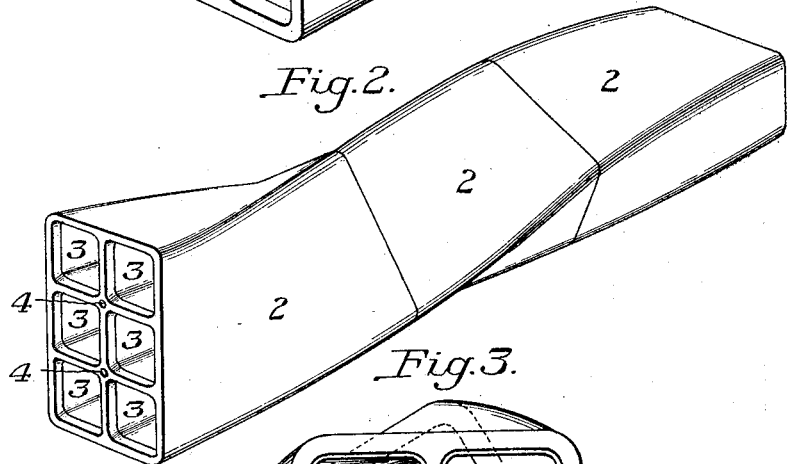
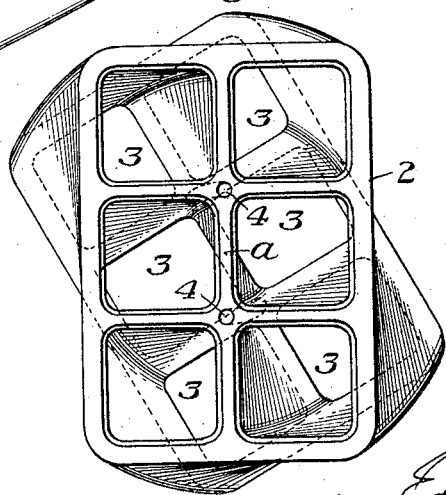
INVENTOR
Edwin Babb
his attorney Patented Sept. 6, 1932

1,876,444

UNITED STATES PATENT OFFICE

EDWIN BABB, OF AULTMAN, OHIO, ASSIGNOR TO NATIONAL FIREPROOFING CORPORATION, OF PITTSBURGH, PENNSYLVANIA, A CORPORATION OF PENNSYLVANIA

METHOD OF MAKING CONDUITS OR THE LIKE

Original application filed May 2, 1928, Serial No. 274,533, and in Canada May 28, 1928. Divided and this application filed October 1, 1930. Serial No. 485,692.

This invention relates broadly to a method of making conduit or the like, and more particularly to a method of making conduit for containing current carrying conductors. It relates still more particularly to a method of making conduit sections for use in transposing a conduit from one position to another while its general direction is maintained.

This application is a division of my copending application, Serial No. 274,533, filed May 2, 1928, which has become Patent No. 1,785,403.

My invention is particularly applicable to the making of conduit of the multiple duct type and will be described using such type as an illustrative example. In laying a conduit for an electric installation, it is often desirable for various reasons to transpose the positions of the respective conductors while at the same time maintaining the general direction of the conduit. For instance, it may be desired to run a multiple duct main substantially in a straight line and to take off taps at intervals substantially at right angles to the main and in the same direction, but from different conductors. It is, of course, most convenient that the conductor being tapped be at such time nearest the direction in which the tap is taken off. It is consequently desirable to bring the various conductors in turn to the desired side of the conduit.

Multiple duct conduit is generally of a shape other than square or round. When laying a length of such conduit it is often necessary, due to crowded building conditions or to intersecting pipes and obstructions of various natures, to reduce the dimension of the conduit in one direction for a limited portion of its length in order to avoid such obstructions. At the same time an effective insulation must be maintained between the respective conductors and between the interior and exterior of the conduit. It is consequently impossible with the standard type of multiple duct conduit heretofore known to reduce one dimension of the conduit without impairing its insulation or necessitating the use of separate smaller sections to contain the various conductors.

When using conduit as heretofore known it has in many instances been the standard practice, due to the lack of more suitable means, to install a manhole in a conduit line solely for the purpose of changing the position of the conduit. For example, if a conduit were being laid in an upright position and an obstacle were being approached which would necessitate turning the conduit at 90° about its axis in order that the obstacle might be passed, a manhole would be inserted into the conduit line shortly before the obstacle were reached, the conduit entering the manhole in its upright position and leaving it at the opposite side in a position turned at the desired 90°. Such a construction not only involved the great additional expense of installing the manhole and the cost of the materials used therein, but also necessitated splicing of the cable or wires in the manhole, thereby entailing further expense.

I have solved the problems above set forth by the provision of the transposing conduit section which is twisted substantially about its axis. The axis of each section, and consequently of the entire length of conduit, may be substantially straight if desired and at the same time by the use of my transposing conduit sections at desired places the various conductors may be brought to desired positions and a desired dimension of the conduit may be reduced to facilitate avoiding obstacles.

I provide a transposing conduit section which is formed to turn or twist about its own axis. The section may be provided with substantially parallel end faces, the conductor containing duct or ducts extending generally in a direction perpendicular to an end face of a section but being curved about an axis substantially perpendicular to such end face.

The ducts may be formed to change their position with respect to the axis of the section while not changing position with respect to each other. An element of the surface of the section will ordinarily form substantially a spiral curve. In cases where the axis of the section is a straight line the general direction of the ducts remains the same, the body of the section curving about its axis. In a multiple duct installation the ducts at one portion of the conduit may lie substantially directly one above the other and at another portion be angularly disposed with respect to the vertical. Conduit may thus be provided which at one point has its greatest dimension vertical and which gradually twists about its own axis to another point at which its greatest dimension is horizontal.

I further provide a method of making a conduit section of the type above mentioned which comprises providing a length of workable material and twisting the same substantially about its axis. A length of ceramic material may be extruded in a manner usual in the formation of electric conduit and subsequent to the extrusion may be displaced in a direction substantially perpendicular to its axis to provide for the transposition of respective portions of the conduit.

In the accompanying drawing I have shown a present preferred embodiment of the invention wherein Figure 1 is a perspective view of a transposing conduit section;

Figure 2 is a perspective view of three sections such as that shown in Figure 1, laid end to end; and Figure 3 is an end view of a conduit section such as shown in Figures 1 and 2.

Referring more particularly to the drawing, reference numeral 2 designates generally a section of conduit. It is provided with a number of ducts 3 adapted for containing current carrying conductors. The body of the section is twisted in a direction substantially perpendicular to its length so that while the general direction of the respective ducts is maintained, their position with respect to the axis of the conduit is altered, but their position relative to each other is not. The axis of the sections is a straight line, as will be apparent by viewing Figure 3 of the drawing, wherein the axis is indicated by the letter *a*. The sections are provided with dowel pin receiving holes 4.

The end faces of the respective sections are plane and substantially parallel. The angle of twist in a given length of conduit may be varied as desired and a twist of 30° in a length of two feet is found to be most satisfactory. When three sections, each two feet long and having a 30° twist, are placed end to end as shown in Figure 2, a complete quarter turn of the conduit is effected within the short space of six feet. If the conduit is being laid upright and an obstacle is encountered, three transposing sections may be inserted whereby the greatest dimension of the conduit is changed from the vertical to the horizontal and the least dimension replaces the greatest dimension in the vertical direction. The conduit may, if desired, be displaced either more or less than 90°. As will be apparent from Figure 2, an element of the surface of the conduit forms substantially a spiral curve.

A section of this type of conduit may be easily and cheaply manufactured by extruding a length of ceramic material through a die in the usual manner and then turning or twisting such length about its axis. The twisting may be effected either during the extrusion process or after it has been completed. The resultant product is baked in order to give it the desired efficiency.

While I have shown and described a present preferred embodiment of the invention, it is to be understood that the same is not limited thereto but may be otherwise embodied and practiced within the scope of the following claims:

I claim:

1. A method of making conduit or the like, comprising extruding a hollow length of ceramic material other than a hollow right cylinder whose wall is of uniform thickness and twisting the extruded length.

2. A method of making conduit or the like, comprising providing a hollow length of workable material other than a hollow right cylinder whose wall is of uniform thickness and twisting the same substantially about its axis.

3. A method of making conduit or the like, comprising providing a hollow length of ceramic material other than a hollow right cylinder whose wall is of uniform thickness and twisting the same while maintaining its axis substantially unchanged.

4. A method of making conduit or the like, comprising extruding a hollow length of ceramic material having a substantially straight axis other than a hollow right cylinder whose wall is of uniform thickness and twisting such length of material substantially about its axis.

5. A method of making conduit or the like, comprising providing a length of ceramic material having a plurality of hollow ducts therethrough and working such lengths to change the position of the ducts with respect to the axis of the length of material but not with respect to each other.

6. A method of making conduit or the like, comprising extruding a hollow length of material other than a hollow right cylinder whose wall is of uniform thickness and thereafter displacing such length of material in a direction substantially perpendicular to its axis.

7. A method of making conduit or the like, comprising providing a hollow length of workable material other than a hollow right cylinder whose wall is of uniform thickness and deforming the same to curvedly dispose the body of the length of material about its axis.

8. A method of making conduit or the like, comprising providing a length of material having an axis and having a hollow duct extending longitudinally thereof other than a hollow right cylinder whose wall is of uniform thickness, and working such length of material to rotate a portion of the duct about the axis of the length as a center.

In testimony whereof I have hereunto set my hand.

EDWIN BABB.